United States Patent
Purves et al.

(10) Patent No.: US 10,475,037 B2
(45) Date of Patent: Nov. 12, 2019

(54) METHOD FOR CONFIGURING GUEST CHECKOUT OPTIONS

(71) Applicant: VISA INTERNATIONAL SERVICE ASSOCIATION, San Francisco, CA (US)

(72) Inventors: Thomas Purves, San Francisco, CA (US); Aparna Girish, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 527 days.

(21) Appl. No.: 15/085,740

(22) Filed: Mar. 30, 2016

(65) Prior Publication Data

US 2016/0292682 A1    Oct. 6, 2016

Related U.S. Application Data

(60) Provisional application No. 62/140,810, filed on Mar. 31, 2015.

(51) Int. Cl.
| | |
|---|---|
| *G06Q 30/00* | (2012.01) |
| *G06Q 20/40* | (2012.01) |
| *G06Q 20/38* | (2012.01) |
| *G06Q 30/06* | (2012.01) |

(52) U.S. Cl.
CPC ......... *G06Q 20/405* (2013.01); *G06Q 20/389* (2013.01); *G06Q 30/0609* (2013.01)

(58) Field of Classification Search
CPC ..................... G06Q 30/0601; G06Q 30/0641
USPC ............................................... 705/26.1, 27.1
See application file for complete search history.

(56) References Cited

U.S. PATENT DOCUMENTS

| | | | | |
|---|---|---|---|---|
| 2005/0086166 A1* | 4/2005 | Monk | ................... | G06Q 20/04 705/41 |
| 2016/0005029 A1* | 1/2016 | Ivey | ........................ | G09C 1/00 705/44 |

OTHER PUBLICATIONS

Shermach, Kelly, Cookies Crumble, Nov. 1, 2005, American Marketing Association, 39.18: 21-22. (Year: 2005).*

* cited by examiner

*Primary Examiner* — Brittney N Miller
(74) *Attorney, Agent, or Firm* — Loeb & Loeb LLP

(57) ABSTRACT

A computer implemented method of payment. The method includes receiving, via a digital communication network, guest data corresponding to a transaction. The method also includes securely storing guest identifying information in a guest database and determining, via one or more processors, a guest transaction total based on the number of prior transactions associated with the guest identifying information. The method also includes comparing, via the one or more processors, the guest transaction total to a predetermined threshold number of transactions and determining, via the one or more processors, that the guest transaction total is greater than the predetermined threshold number of transactions. Finally, the method includes, in response to the determination that the guest transaction total is greater than the predetermined number threshold number of transactions, removing a guest transaction option.

7 Claims, 6 Drawing Sheets

METHOD FOR CONFIGURING GUEST CHECKOUT OPTIONS

CROSS-REFERENCE TO RELATED APPLICATIONS

This application claims priority to U.S. Provisional Application No. 62/140,810, filed Mar. 31, 2015, the entirety of which is incorporated by reference herein.

BACKGROUND

Consumers have a variety of options to pay for goods. From debit cards to credit cards, to direct account access, the manners of paying for goods are many and varied. Users may be tempted to try one or more different payment options but trying to keep users using a specific payment method has long been a challenge and continues to be a challenge. Thus, users may continue to test one payment method after another without completing a registration to enroll in a single, consistent form of payment. Users and payment option issuers both benefit from consistent use of payment forms.

A solution is needed that will encourage users conducting electronic purchases to enroll in payment systems that can retrieve data accurately and efficiently for use in future purchases.

SUMMARY

In an embodiment, the disclosure describes a computer implemented method of payment. The method includes receiving, via a digital communication network, guest data corresponding to a transaction. The method also includes securely storing guest identifying information in a guest database and determining, via one or more processors, a guest transaction total based on the number of prior transactions associated with the guest identifying information. The method also includes comparing, via the one or more processors, the guest transaction total to a predetermined threshold number of transactions and determining, via the one or more processors, that the guest transaction total is greater than the predetermined threshold number of transactions. Finally, the method includes, in response to the determination that the guest transaction total is greater than the predetermined number threshold number of transactions, removing a guest transaction option.

In another embodiment, the disclosure describes a computer implemented method of payment. The method includes receiving, via a digital communication network, guest data corresponding to a transaction and securely storing guest identifying information in a guest database. The method includes determining, via one or more processors, a guest transaction total based on the number of prior transactions associated with the guest identifying information. The method also includes comparing, via the one or more processors, the guest transaction total to a predetermined threshold number of transactions and determining, via the one or more processors, that the guest transaction total is greater than the predetermined threshold number of transactions. The method includes determining, via the one or more processors, that a transaction value of the transaction does not exceed a minimum transaction value and, in response to the determination that the guest transaction total is greater than the predetermined number threshold number of transactions and the transaction value does not exceed the minimum transaction, preventing a guest transaction.

In another embodiment, the disclosure describes a computer implemented method of creating a user account. The method includes receiving, via a digital communication network, guest data corresponding to a transaction and securely storing guest identifying information in a guest database. The method includes determining, via one or more processors, a guest transaction total based on the number of prior transactions associated with the guest identifying information. The method also includes comparing, via the one or more processors, the guest transaction total to a predetermined threshold number of transactions and determining, via the one or more processors, that the guest transaction total is greater than the predetermined threshold number of transactions. In response to the determination that the guest transaction total is greater than the threshold number of transactions, the method includes generating a notification that the threshold number of transactions has been exceeded and forcing the user to create non-guest account. The method also includes, in response to the creation of the non-guest account, completing the transaction.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

Specification

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

In one aspect of the disclosure, a user may use or test a system for a given or predetermined number of times and then the user may be forced to enroll in the system. In another aspect, after the given number of uses, the ability to pay without registering with the system may be withdrawn. In either embodiment, the user faces a limit as to the number of times a payment system may be used without registering for the system. In this arrangement, a user may be permitted to "test out" a payment system for a few, limited number of tries but will be forced to either sign up for the service or stop using the service once the limited number of tries has been reached. Thus, the system and method described herein is an approach to solve a unique problem specific to computer payment systems which did not even exist before computers and networks.

Figure 1:
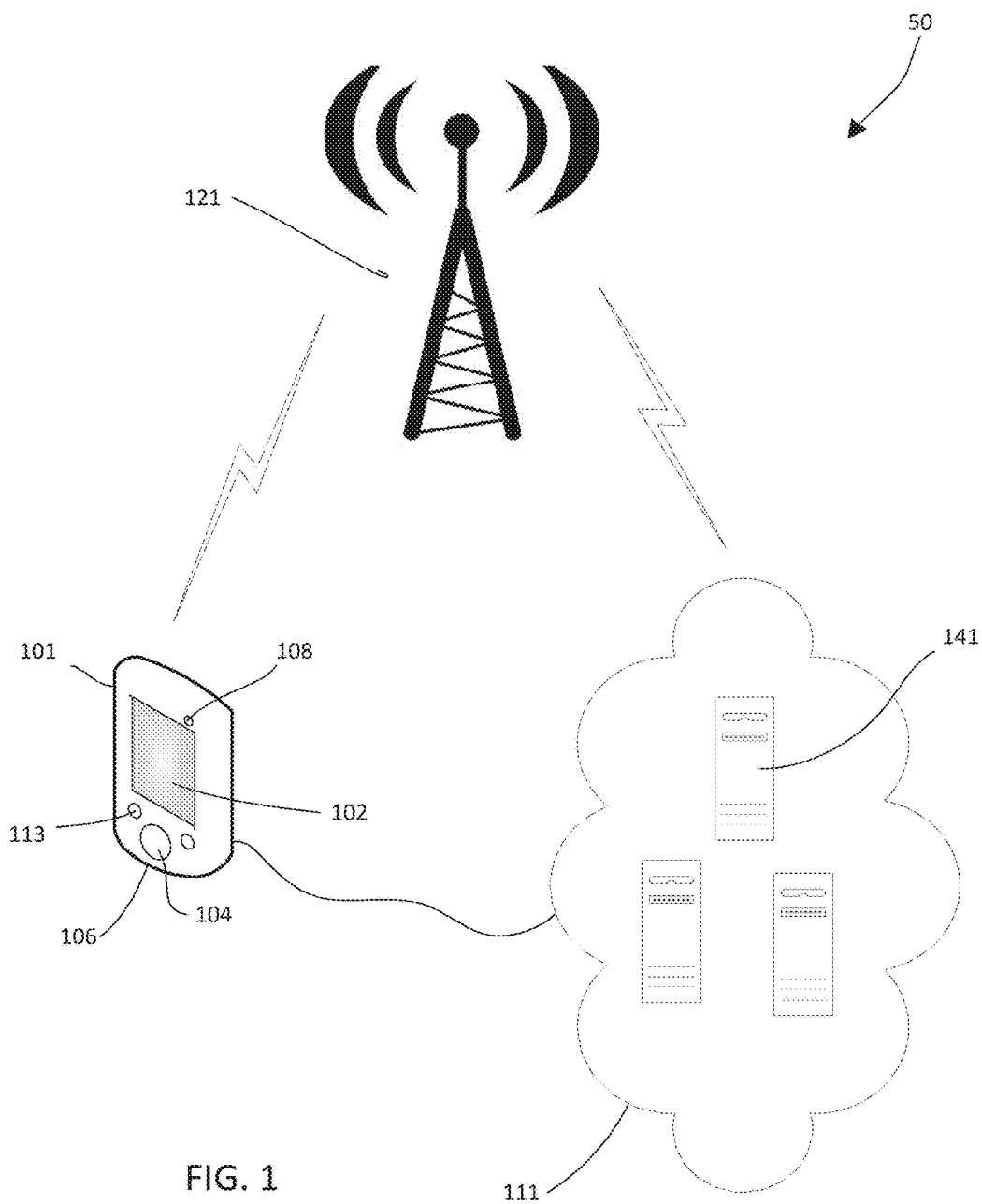
FIG. 1 is an illustration of the elements of an embodiment of a system that includes a guest checkout decision engine as disclosed herein.

FIG. 1 is a high level illustration of an embodiment of certain elements in a sample computing system 50 that may be physically configured to implement the method and system for guest checkout decision engine and flows, as shown and described herein. The computing system 50 may include a dedicated computing device 141, a dedicated portable computing device 101, an application on the computing device 141 for implementing the guest checkout engine, an application on the portable computing device 101 for implementing the guest checkout engine, or a combination of all of these. FIG. 1 shows high level illustration of an embodiment of a portable computing device 101 communicating with a remote computing device 141, but the application may be stored and accessed in a variety of ways. The portable computing device 101 may be any of a variety of computing devices, such as a cellular telephone, tablet computer, laptop computer, desktop computer, etc. In addition, the application may be obtained in a variety of ways such as from an app store, from a web site, from a store WiFi system, etc. There may be various versions of the application to take advantage of the benefits of different computing devices, different languages and different API platforms.

Figure 2:
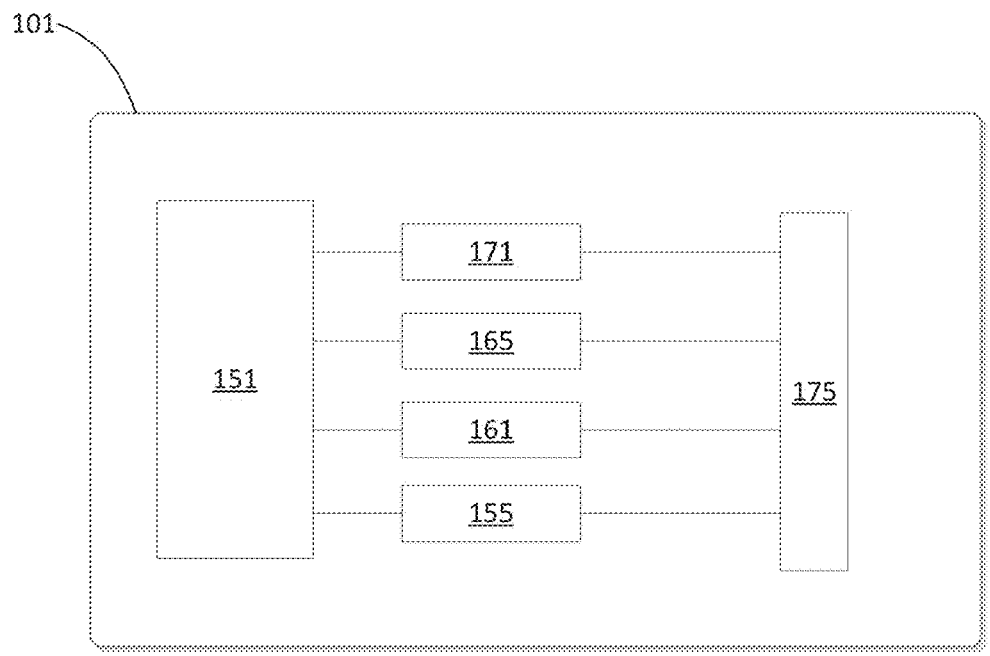
FIG. 2 is an schematic illustration of elements of an embodiment of a portable computing device.

In one embodiment, a portable computing device 101 may be a device that operates using a portable power source 155, as shown in FIG. 2, such as a battery. The portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 113 to communicate sounds.

The portable computing device 101 may be able to communicate with a computing device 141 or a plurality of computing devices 141 that make up a cloud of computing devices 111. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication network 121 such as cellular service, through the Internet, through a private network, through Bluetooth, etc.

Figure 3:
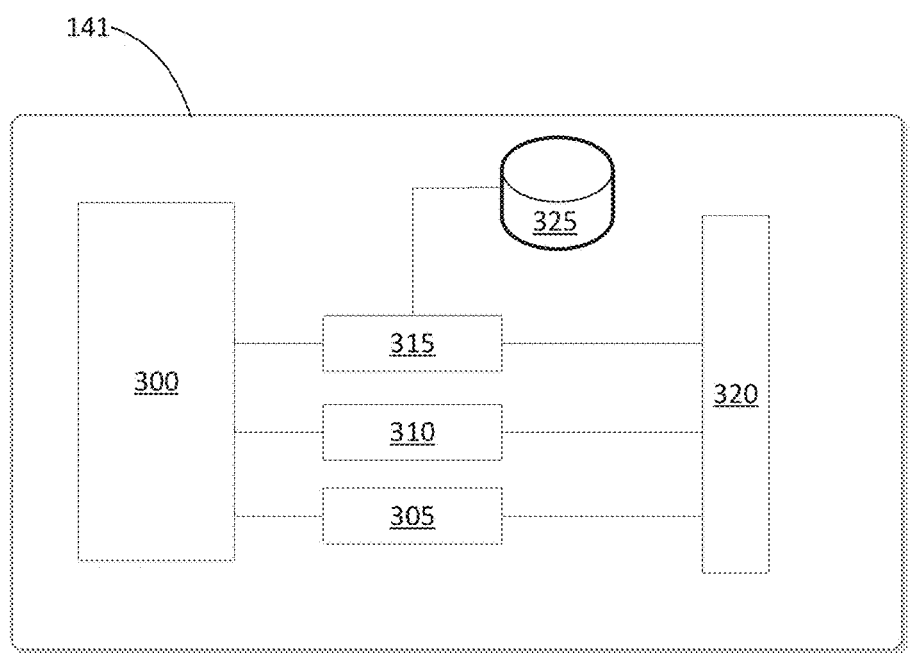
FIG. 3 is a schematic illustration of elements of an embodiment of a server type computing device.

FIG. 2 is simplified illustration of the physical elements that make up an embodiment of a portable computing device 101 and FIG. 3 is a simplified illustration of the physical elements that make up an embodiment of a server type computing device 141. Referring to FIG. 2, a sample portable computing device 101 is illustrated that is physically configured according to be part of the computing system 50 shown in FIG. 1. The portable computing device 101 may have a processor 151 that is physically configured according to computer executable instructions. In some embodiments, the processor can be specially designed or configured to optimize communication between the portable computing device 101 and the computing device 141 relating to the guest checkout decision engine described herein. The portable computing device 101 may have a portable power supply 155 such as a battery which may be rechargeable. It may also have a sound and video module 161 which assists in displaying video and sound and may turn off when not in use to conserve power and battery life. The portable computing device 101 may also have volatile memory 165 and non-volatile memory 171. The portable computing device 101 may have GPS capabilities that may be a separate circuit or may be part of the processor 151. There also may be an input/output bus 175 that shuttles data to and from the various user input/output devices such as the microphone 106, the camera 108, a display 102, or other input/output devices. The portable computing device 101 also may control communicating with the networks, such as communication network 121 in FIG. 1, either through wireless or wired devices. Of course, this is just one embodiment of the portable computing device 101 and the number and types of portable computing devices 101 is limited only by the imagination.

The physical elements that make up an embodiment of the remote computing device 141, such as the remote institution, are further illustrated in FIG. 3. In some embodiments, the remote computing device 141 is a server or, more specifically, a guest tracking server specially configured to run the guest checkout decision engine as described herein. At a high level, the computing device 141 may include a digital storage such as a magnetic disk, an optical disk, flash storage, non-volatile storage, etc. Structured data may be stored in the digital storage such as in a database. More specifically, the computing device 141 may have a processor 300 that is physically configured according to computer executable instructions. In some embodiments, the processor 300 can be specially designed or configured to optimize communication between a portable computing device, such as portable computing device 101, and the computing device 141 relating to the guest checkout decision engine described herein. The computing device 141 may also have a sound and video module 305 which assists in displaying video and sound and may turn off when not in use to conserve power and battery life. The computing device 141 may also have volatile memory 310 and non-volatile memory 315.

A database 325 for digitally storing structured data may be stored in the memory 310 or 315 or may be separate. The database 325 may also be part of a cloud of computing device 141, such as cloud 111 in FIG. 1, and may be stored in a distributed manner across a plurality of computing devices 141. There also may be an input/output bus 320 that shuttles data to and from the various user input devices such as a microphone, a camera, a display monitor or screen, etc. The input/output bus 320 also may control communicating with the networks, such as communication network 121, either through wireless or wired devices. In some embodiments, the application running the guest checkout decision engine may be located on the portable computing device 101. However, in other embodiments, the application may be located on remote computing device (guest tracking server) 141, or both the portable computing device and the remote computing device 141. Of course, this is just one embodiment of the remote computing device 141 and additional types of portable computing devices 141 are contemplated herein.

Figure 4:
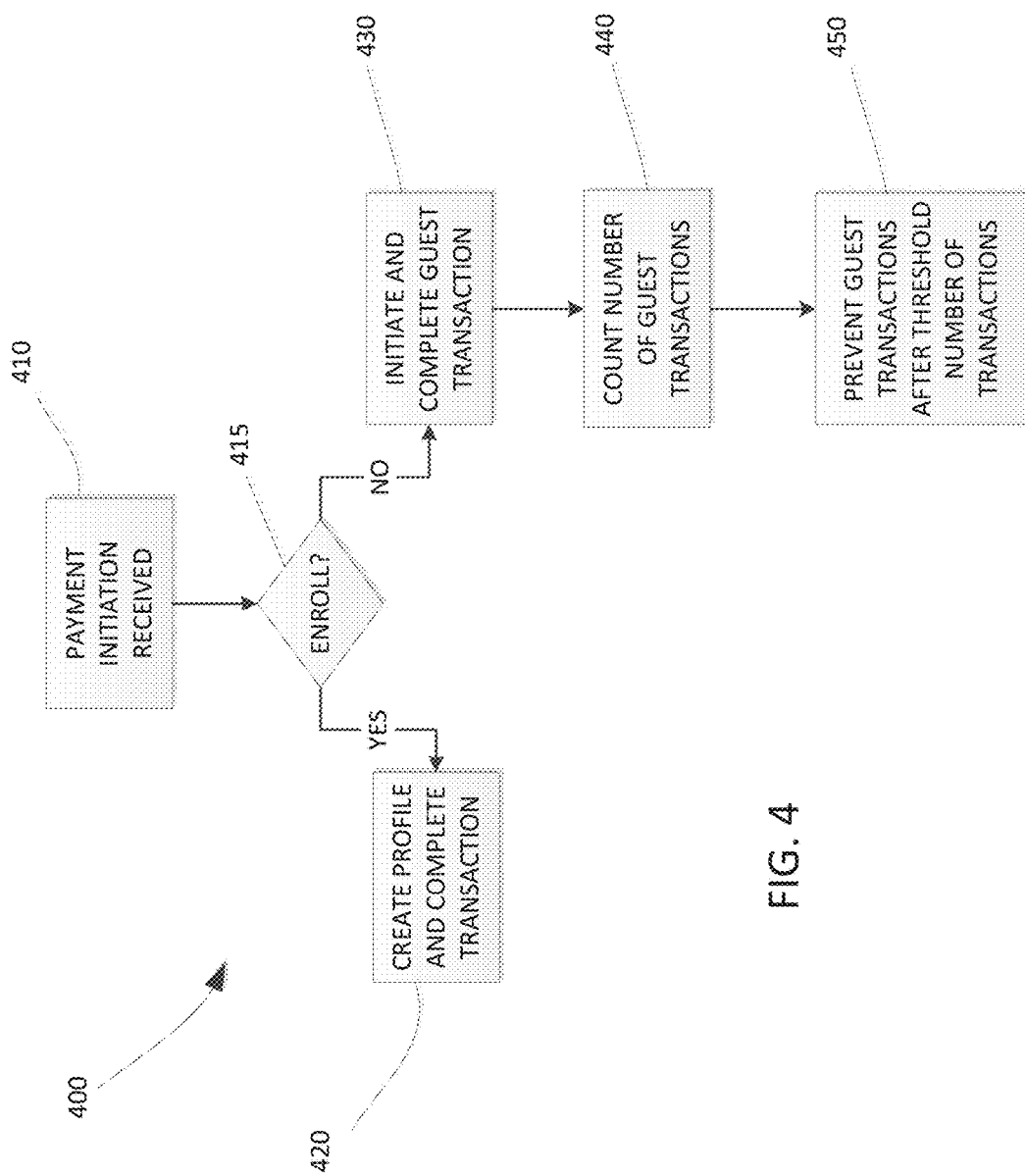
FIG. 4 is a flow chart depicting an embodiment of a computerized method of the guest checkout decision engine.

FIG. 4 shows a high level illustration of an embodiment of a computerized method 400 for limiting the use of a guest payment option on a payment platform, such as by using the guest checkout decision engine as described herein. Upon receiving initiating the payment system at block 410, in the illustrated embodiment, the system receives indication from the user, at 415, whether the user will enroll an account with the system or proceed as a guest. If the user indicates that it would like to enroll, at block 420 the system proceeds to create an account profile including the user's guest data and moves on to completing the transaction as an enrolled member. If the user indicates that it would not like to enroll and instead proceed as a guest, at block 430 the system initiates and complete a guest transaction based on guest data received from the user. At block 440, the system can count the number of times a particular user completes a transaction as a guest. Finally, at block 450, the guest checkout and design engine can prevent a user from completing any additional transactions as a guest once that user has completed a predetermined threshold number of guest transactions.

Figure 5:
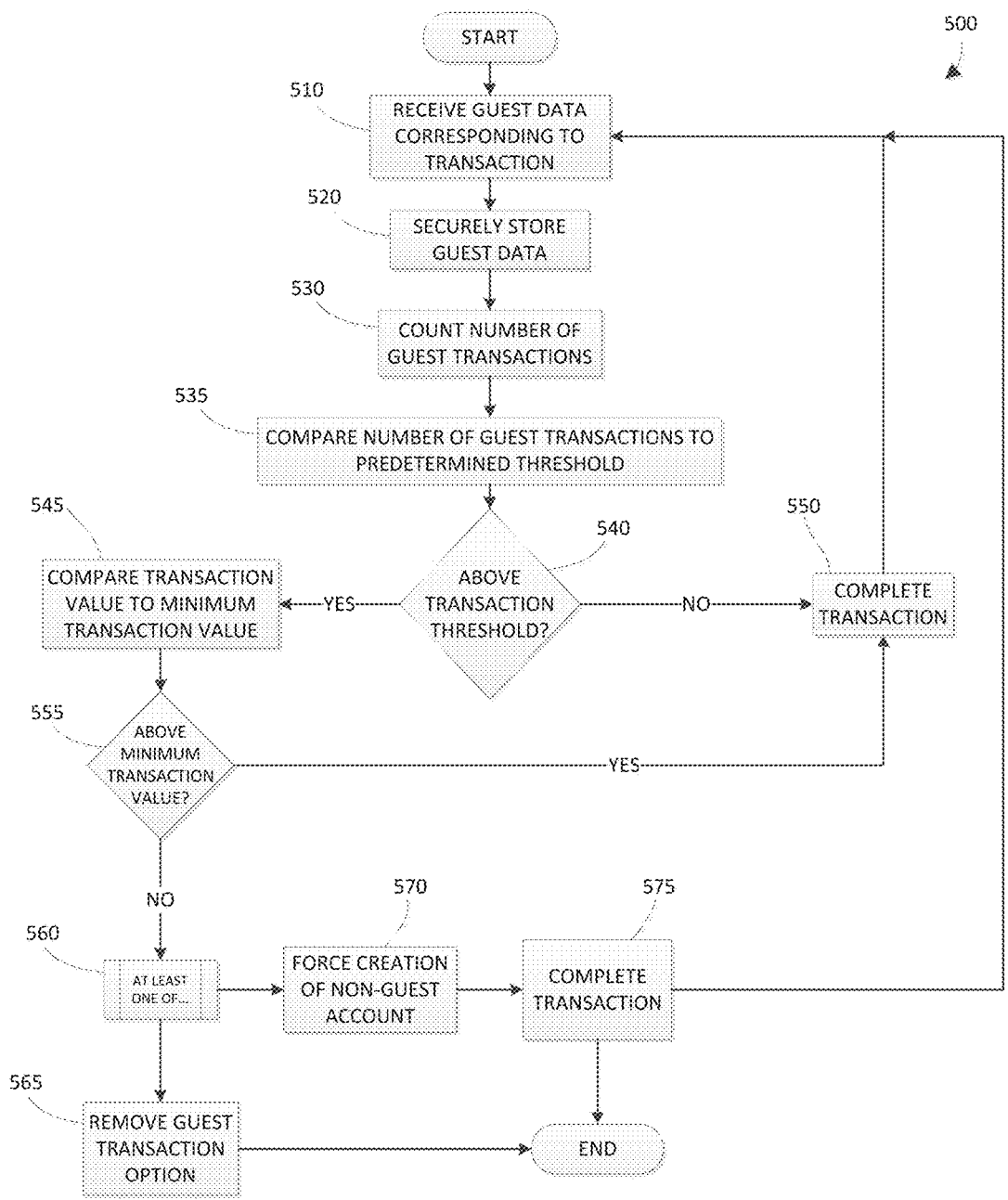
FIG. 5 is a flow chart depicting another embodiment of a computerized method of the guest checkout decision engine.

Referring now to FIG. 5, an embodiment of a method 500 of implementing the guest checkout decision engine is shown. At block 510, guest data corresponding to a transaction is accepted from a user. The guest data can be guest identification information, credit card data, or other information that is sufficient to enable a guest transaction. The guest data may be received and accepted in any of a variety of suitable ways, such as through manual input into a portable computing device, such as portable computing device 101, camera image capture, a bar code scanner, radio frequency identification (RFID), magnetic strip, near field communication (NFC), Bluetooth, etc., or any other wired or wireless communications protocol. In some embodiments, the guest data is received wirelessly from a user's local computing device, such as local computing device 101 in FIGS. 1 and 2. In one embodiment, the guest data may include an account number, such as a bank account. In another embodiment, the guest data may include a credit card number or a debit card number and any other data a merchant deems necessary to complete a transaction such as an expiration date, a CCV number, a password, a personal identification number (PIN), etc. In yet another embodiment, the guest data may include an alias that represents an account number, a credit card number or a debit card number. In some embodiments, the alias can be a username, a nick name, email address, etc. In some embodiments, the guest checkout decision engine can receive data specific to the computing device 101 used for the transaction, such as an Internet Protocol (IP) address, or any other form of electronic or digital marker suitable to identify the user's computing device. In yet other embodiments, the guest checkout decision engine can store an HTTP or browser cookie on an Internet browser of the user's computing device that identifies the guest checkout decision engine can identify each time a user executes a transaction, or that can provide the guest checkout decision engine with data. In some embodiments, upon receiving a user's guest data, the guest checkout decision engine can generate a guest ID associated with the guest data or associated identifying data or information described above.

At block 520, the guest data, which may include guest identifying information corresponding to the transaction or the guest ID, may be securely stored using any suitable digital security or encryption. In one embodiment, the guest data may be stored in a networked cloud of computing devices which is accessible from a plurality of networked computing devices. The data may be stored in a variety of secure locations and servers such that if one server goes down, the data will remain accessible. In some embodiments, the guest data may be communicated over a payment system specific network. The payment network, such as the payment network operated by Visa, is a secure network that has great capacity but also great security. The use of the payment network may have operational benefits such as increased speed and data security. In some embodiments, the guest data can be stored in a database, such as database 325 in FIG. 3. In some embodiments, the database 325 can be specially configured for storing guest identifying information and guest transaction data so as to provide increased and improved functionality to the payment system in reliably and accurately retrieving guest information when called upon by the guest checkout decision engine.

At block 530, the server may review the guest data and determine the number of times the guest data has been used previously by this payment system. In some embodiments, this determination can be done by reference to the identifying information associated with the guest data, such as an email address or username. Logically, guest data from previous transactions may be stored such that accounts may be debited and credited and that future adjustments may be made based on returns, etc. The guest data may be accessed over the payment network or another network. Further, in some embodiments, an application programming interface (API) can return the current number of transactions for an individual that has used the service. By counting the previous transactions associated with the guest data, the guest checkout decision engine can determine a number of guest transactions for the particular guest ID associated with the guest data.

At 535, the guest checkout decision engine compares the number of guest transactions to a predetermined threshold number of transactions. In some embodiments, the threshold number of transactions may simply be a number of transactions, such as five. In such embodiments, a user using specific guest data could use a guest transaction five times with no consequences and no additional requirements. In additional embodiments, the threshold may also or separately include a time element. For example, a user may be limited to three uses in three months and if there is a request for a fourth use, the request may be considered over the threshold. In some embodiments, the user may be permitted additional uses after expiration of the threshold time period or, alternatively, the user may be foreclosed from any additional uses after the three-month threshold regardless of prior use frequency. The threshold may be set by an account issuer, a processor, or any other party in the transaction.

The threshold determination may be even more detailed. In some embodiments, the proposed dollar amount of the transaction may be a factor that affects the threshold. In some such embodiments, the threshold number of transactions may be determined based on a transaction value of the transaction. For example, if the transaction for which the guest user is attempting to enter is a large transaction that will be lost if the guest is not permitted to exceed the threshold, the threshold may be raised. In some embodiments, a predetermined minimum transaction value can be compared to the value of the guest user's immediate transaction determine whether the transaction value is above the predetermined minimum transaction value. If the guest checkout decision engine determines that the transaction value, for example, meets or exceeds the minimum transaction value, in some embodiments, the guest checkout engine will allow the user to completed the transaction as a guest even if the threshold number of guest transactions has been exceeded. In other embodiments, the guest checkout decision engine may allow a predetermined number of additional transactions in excess of the threshold number of guest transactions so long as those additional transactions involve values that meet or exceed the minimum transaction value. In such embodiments, the guest checkout decision engine may remove the guest transaction option regardless of the transaction value if that the guest data provided associated with a particular guest ID has been previously used in a number of transactions above the predetermined number of additional transactions. In yet other embodiments, the guest checkout decision engine may reduce the threshold number of guest transactions if the transaction is for an amount that is less than a predetermined low transaction amount. Similarly, if a guest user associated with provided guest data has consistently used the service for relatively small transactions, the threshold number of guest transactions may be lowered for that user and if the service has been consistently used for high value services, the threshold number of guest transactions may be raised to allow additional transactions.

Similarly, the threshold may be adjusted based on the desirability of the customer. For example, if the customer is viewed as being very valuable by a suitable measure, then the threshold may be raised; alternatively, if the customer is more of a loss leader, the threshold may be lowered. Of course, what makes a customer valuable may differ and may be controlled by an algorithm or other suitable methods or mechanisms.

In addition, past experience may be used to tune the threshold based on a variety of factors. In some such embodiments, the threshold number of transactions may be determined based on past transactions corresponding to guest identifying information. For example, if in the past the threshold was set at four and people stopped using the service, then the threshold may need to be increased to provide guest user's with additional time to appreciate the product experience. Similarly, people of high net worth may have a different appreciation of the service than users with a lower net worth and the model may learn this over time by reviewing past interactions and adjusting the algorithm automatically. In some embodiments, this can be achieved by comparing net worth data of individual users and the number and value of guest transactions completed prior to enrolling in a non-guest account. If, for example, such a comparison indicates that high net worth users tend to enroll in non-guest accounts after three guest transactions, the predetermined number of guest transactions could be lowered to three or four at least for guest users identified as having relatively high net worth. Alternatively, if such an analysis determines that guest users with relatively low net worth are more likely to enroll in a non-guest account only after completing eight or nine guest transactions, for example, the guest checkout engine can automatically set the threshold number of guest transactions at about eight or nine to reflect these findings. Of course, other demographic-specific data and transactions threshold correlations are contemplated herein.

At block 540, in response to a determination that the guest user has not exceeded the threshold number of guest transactions, the system may, at block 550, complete the transaction. Alternatively, if the guest checkout decision engine determines that the guest user has exceeded the threshold number of guest transactions the system may, at block 545, compare the value of the immediate transaction to a minimum transaction value. In such embodiments, at block 555, the guest checkout decision engine allows the transaction to be completed if it determines that the transaction value is greater than a minimum transaction value. If, on the other hand, the transaction value is determined to be less than the minimum transaction value, the guest checkout decision engine, at block 560, may take at least one of several steps to entice the user to enroll in the service and not just use the service as a guest. The steps may be selected on a variety of factors. In one embodiment, there is a default approach. In another embodiment, there is an algorithm that is used to determine the desired approach based on past interactions and results. In other embodiments, the system may not evaluate the value of a transaction and may proceed directly to removing guest transaction options or forcing creation of a non-guest account.

Figure 6:
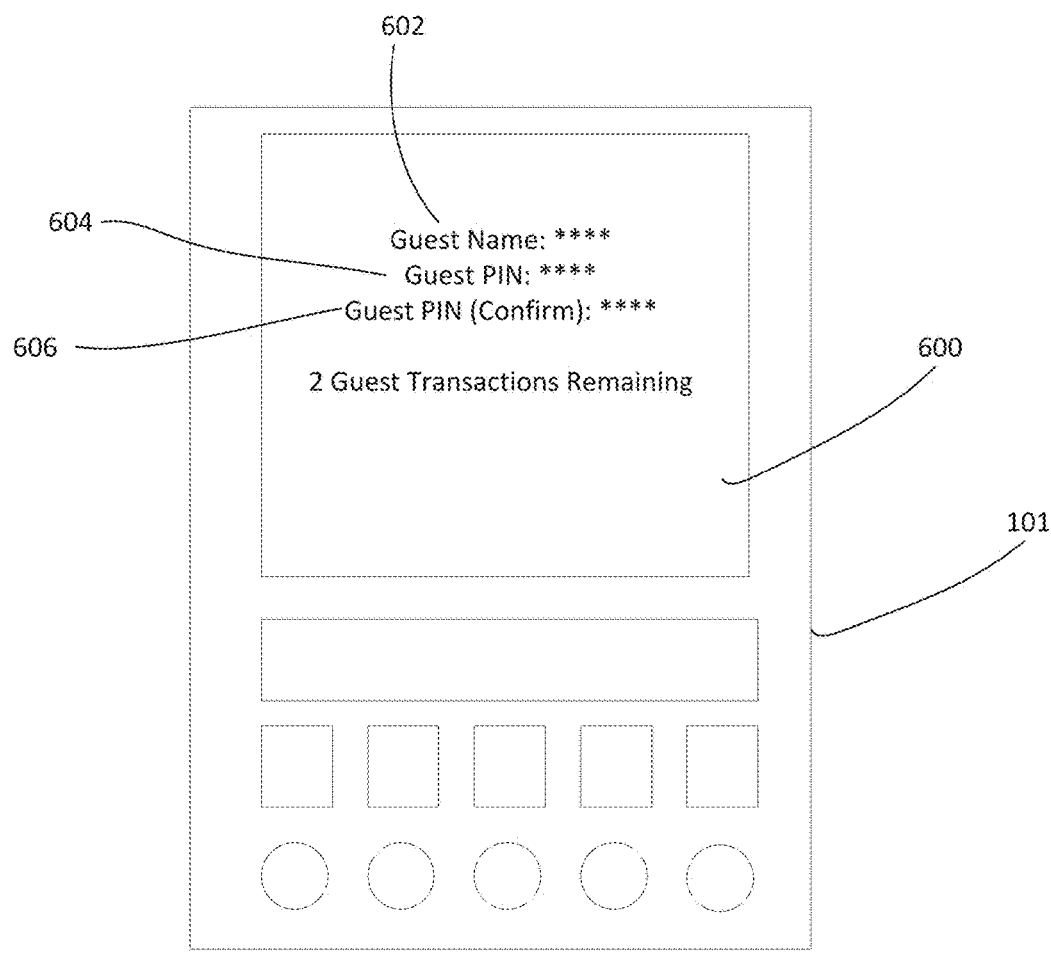
FIG. 6 is an illustration of an embodiment of a graphical user interface used by a system that includes the guest checkout decision engine.

In the embodiment illustrated in FIG. 5 at block 565, one option when the threshold number of guest transactions as been met or exceeded and/or the transaction value is below the minimum transaction value may be to remove the guest transaction option from a payment graphical user interface, such as from the example graphical user interface 600 illustrated in FIG. 6. The graphical user interface (GUI) 600 in FIG. 6 is shown in an embodiment of a portable computing device 101, such as shown in FIG. 1, although other types of devices may be used. In the illustrated embodiment, the GUI 600 includes prompts for guest name 602, guest PIN 604, and guest PIN (confirm) 606. In such embodiments, the guest name and PIN could be associated with a guest ID and with corresponding guest data in order for the guest checkout decision engine to keep track of the number of transactions used with the particular name, PIN, or guest ID. In the embodiment shown in FIG. 6, the GUI 600 also includes a guest transaction indicator 608 that informs the guest user how many additional guest transactions can be completed In some embodiments, the option to complete a transaction as a guest user may be completely removed once the guest transaction threshold number is exceeded and/or minimum transaction value has not been met. In other embodiments, the guest transaction option may be displayed in reduced visibility in comparison to the rest of the graphical user interface and ensuring the guest transaction option is not operational. In some embodiments, on the next to last use before the threshold is reached, the user may be warned that the guest option is no longer be available after the current use. Further, once the threshold is crossed, the user may be informed that the threshold has been crossed and the user may have the option to select a button on the graphical user interface and enroll in the service, thus no longer operating as a guest.

Referring again to FIG. 5, at block 570, another option may be to force the creation of a non-guest account. In such an embodiment, if the user desires to use the payment service moving forward after the threshold has been reached, the user may not be permitted to proceed unless a non-guest payment account is created. The account creation may launch a separate graphical user interface or may launch a separate window. In either case, secure communication can be established to a payment service server where the relevant information may be collected and securely stored. In some embodiments, the data may be communicated over the payment network. In other embodiments, the data may be encrypted using shared keys or tokens from a secure element. If the user decides to set up the non-guest account, the transaction can be completed at 575. Otherwise, if the user refuses to set up an account, the payment service may no longer be available to the user in some embodiments.

Figure 7:
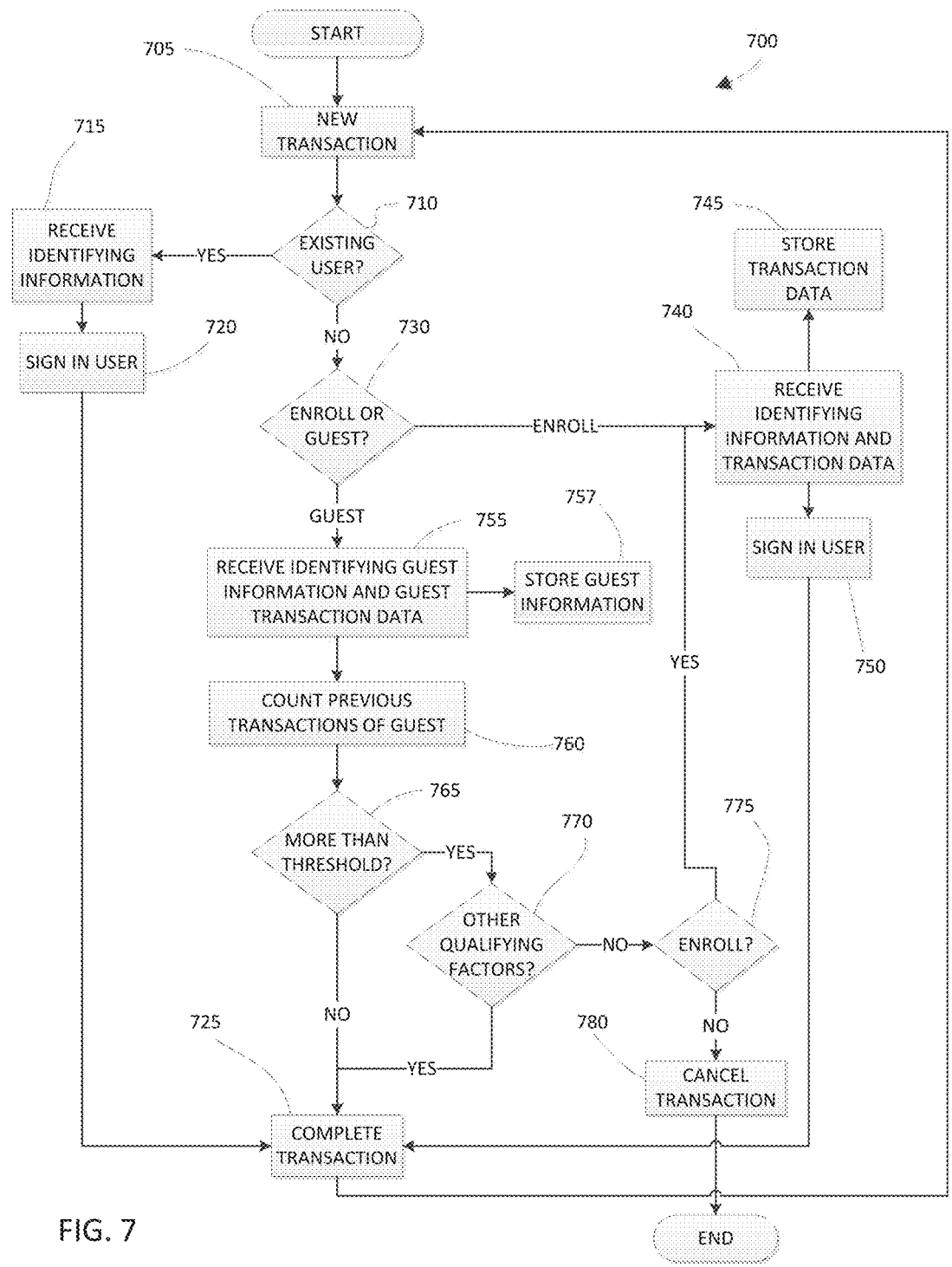
FIG. 7 is a flow chart depicting another embodiment of a computerized method of the guest checkout decision engine.

FIG. 7 is an additional illustration of a checkout process flow 700 using an embodiment of a payment system including the guest checkout decision engine where proceeding as a guest is an option. When a new transaction occurs using the payment system at block 705, the system can then determine, at block 710, whether the user initiating the transaction is an existing enrolled user or not. This determination can be made in any suitable way, for example, by receiving a user input indicating the user is already enrolled or by requesting identification information from the user that can be checked against identification information for existing users. If the user is an existing user, the system receives identifying information, such as a username and password, at block 715. Once the user's identifying information is confirmed, the user is signed in at block 720 and the transaction is completed at block 725. Going back to block 710, if the user is not an existing user, the system can receive an indication from the user whether that user would like to enroll or to proceed with the transaction as a guest (block 730). If the user opts to enroll, the system can, at block 740, request and receive identifying information and guest data from the user in order to enroll the user. In some embodiments, the guest data can be stored, at block 745, for use in future transactions. The user identifying information can be any of a variety of suitable identification techniques, such as email address, phone number, user ID, account number, etc. Once the user has been enrolled, the user can be signed in at block 750 and the transaction can be completed at block 725.

Returning to block 730, if the user indicates that it would like to proceed as a guest, the system can, at block 755, launch the guest checkout decision engine and request and receive identifying guest information and guest transaction data. Like described above with respect to FIG. 5, the identifying guest information can be any of a variety of identifying information provided by the guest or received from the guests computing device by which the system can associate. For example, the identifying guest information can be a username, a user ID, an email address, a telephone number, the IP address of the user's computing device, a cookie stored on the user's browser, etc. Additionally, the guest transaction information received at block 755 can be any type of information used in completing the given transaction; for example, credit card information, address information, credit or debit card PIN numbers, bank account information, etc. In some embodiments, the identifying guest information, guest transaction information, or both can be securely stored at block 757 for use in future transactions or for tracking and identification purposes. At block 760, the system running guest checkout decision engine can count the previous number of times the specific guest user associated with the provided identifying guest information and/or guest transaction data has been used to complete at transaction with the payment system and compare that transaction number to a threshold, such as the thresholds described with reference to FIG. 5. At block 765, the guest checkout decision engine can determine based on the transaction count whether the identified guest has completed more than the predetermined threshold number of transactions. If not, the transaction can be completed at block 725.

If the transaction count exceeds the threshold, the guest checkout decision engine can determine, based on the specific transaction, whether other qualifying factors are present that would allow the transaction to be completed. Some qualifying factors are described with reference to FIG. 5, for example, a relatively high transaction value or a guest user determined identified to belong to a demographic that would benefit from additional guest transactions. If no other qualifying factors are present, the guest checkout decision engine can ask, at block 775, whether the guest user would like to enroll in the payment system to proceed with the transaction. If the guest indicates that it would not like to enroll, then, in some embodiments, the transaction is cancelled at block 780. If the guest user indicates that it would like to enroll, the system can proceed to block 740 and collect the required identifying information and transaction data to enroll the user.

The system and method for payment described and shown herein may have a variety of uses and address several technical problems. In instances where a user insists on using a guest account even after a threshold number of transactions, the user may be forced or encouraged to enroll in the payment system which may result in more payments in the future. As a result, payments which would not have occurred in the past will now occur. An advantage to the consumer is that once an account is created, very little data will have to be entered in the future to use the payment service. An advantage to card issuers and payment processors is more transactions than may have otherwise taken place.

As a result of the system, more people may set up accounts using the payment service. As a result, more users may enjoy the benefits of the payment service. The system is more than just speeding a process but uses a specialized computing system to achieve a new and better outcome to problems specific to payment using computers.

From a technical standpoint, the system and method addresses several problems that only occur in digital, computer based payment systems. While electronic payment systems may create efficiencies, the continued use of guest accounts reduces the efficiencies of purchases for consumers and for merchants as consumers have to enter duplicative information and merchants have to repeated verify entered information. As a result, electronic payments services will now be able to track and limit users from overusing guest privileges in the electronic payment system. Similarly, the threshold for determining overuse may be determined based on a variety of factors which may lead to greater efficiency and more transactions in the future.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated. The attached Appendix may provide more detail regarding the operation of a payment system.

The present disclosure provides a solution to the long-felt need described above. In particular, the systems and methods described herein may be configured for improving payment systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer implemented method of payment, the method comprising:
   transmitting, via a digital communications network, a hypertext transfer protocol (HTTP) cookie to a user computing device associated with a user, the HTTP cookie being identifiable as associated with the user;
   receiving, via the digital communication network, a guest transaction request for a guest transaction from the user computing device, the guest transaction request including a guest transaction value;
   identifying, via one or more processors, the HTTP cookie on the user computing device;
   associating, via the one or more processors, the identified HTTP cookie with the user;

determining, via the one or more processors, a guest transaction total based on a number of prior guest transactions associated with the user;

determining, via the one or more processors, that the guest transaction total is greater than a predetermined threshold number of transactions;

determining, via the one or more processors, that the guest transaction value is lower than a predetermined minimum transaction value; and in response to the determination that the guest transaction total is greater than the predetermined threshold number of transactions and that the guest transaction value is lower than the predetermined minimum transaction value, removing a guest transaction option.

2. The method of claim 1, wherein the HTTP cookie includes guest data comprising at least one of an account number, a credit card number, or a debit card number.

3. The method of claim 1, wherein the HTTP cookie includes guest data comprising an alias that represents at least one of an account number, a credit card number, or a debit card number.

4. The method of claim 1, further comprising determining guest identifying information from guest data included in the HTTP cookie.

5. The method of claim 1, further comprising determining, via the one or more processors, that the guest transaction total is greater than the predetermined threshold number of transactions during a predetermined threshold time period.

6. The method of claim 1, further comprising raising the threshold number of transactions based on the guest transaction value of the guest transaction.

7. The method of claim 1, wherein removing the guest transaction option includes terminating the quest transaction.

* * * * *